United States Patent
Buckley et al.

[15] 3,673,162
[45] June 27, 1972

[54] COPOLYAMIDES FROM BIS(AMINOPHENYL)SULFONE

[72] Inventors: Alan Buckley; Ieuan Thomas, both of Runcorn, England

[73] Assignee: Imperial Chemical Industries Limited, London, England

[22] Filed: April 17, 1970

[21] Appl. No.: 29,698

[30] Foreign Application Priority Data

May 2, 1969 Great Britain.....................22,509/69

[52] U.S. Cl.....................260/78 R, 260/29.2 N, 260/30.2, 260/30.6 R, 260/30.8 R, 260/32.6 N, 260/37 N, 260/47 CZ, 260/65, 260/78 S, 260/78 SC
[51] Int. Cl........................................................C08g 20/20
[58] Field of Search ...............................................260/78 R

[56] References Cited

UNITED STATES PATENTS

| | | | |
|---|---|---|---|
| 3,206,438 | 9/1965 | Jamison | 260/78 R |
| 3,322,728 | 5/1967 | Hill et al. | 260/78 R |
| 3,505,296 | 4/1970 | Burrows et al. | 260/78 R |

*Primary Examiner*—Harold D. Anderson
*Attorney*—Cushman, Darby & Cushman

[57] ABSTRACT

The hydrolytic stability (and especially the resistance to immersion in boiling water) of polyamides of bis(amino-phenyl)sulphones (or mixtures thereof with up to 20 mole percent of at least one other diamine) and $\alpha,\omega$-polymethylene dicarboxylic acids having from six to 16 carbon atoms in all is improved by replacing from 3 to 36 mole percent of the dicarboxylic acid with a carbocyclic dicarboxylic acid. The products are useful as thermoplastic moulding materials and for conversion of films and fibers.

11 Claims, No Drawings

COPOLYAMIDES FROM BIS(AMINOPHENYL)SULFONE

This invention relates to copolyamides based on bis(aminophenyl)sulphones and α,ω-polymethylene dicarboxylic acids.

High molecular weight polyamides of bis-aminophenyl)sulphones and α, ω-polymethylene dicarboxylic acids containing at least six and preferably six to 16, carbon atoms (including carboxy carbon atoms) are known. The possibility of replacing up to 50 mole percent of the polymethylene dicarboxylic acid residues in the macromolecular chains by the residues of other dicarboxylic acids e.g., malonic acid, 2-methyl glutaric acid, 2-vinyl adipic acid or isophthalic acid, is known also These polyamides have a very desirable combination of properties for thermoplasts. They are essentially amorphous and substantially non-crystallizable materials having unexpectedly high softening points and yet their resistance to thermal degradation and oxidation is such that they can be moulded or extruded in the heat-softened state on conventional thermoplastic moulding machinery to give useful shaped products, and these products retain their room temperature strength to a marked degree at elevated temperatures e.g., of 140° C. or even above. However, for some applications, e.g., hot water piping, sterilizable surgical apparatus and especially fibers, these polymers tend to have inadequate hydrolytic stability, particularly on immersion in boiling water.

We have now found that their hydrolytic stability, and in particular their ability to withstand immersion in boiling water, may be improved without unduly damaging their other desirable properties by including within the macromolecular chains residues of certain dicarboxylic acids within particular limits of concentration.

According to the present invention we provide a copolyamide having a reduced viscosity, measured on a solution of 1g of polymer in 100 ml of a 5 percent by weight solution of lithium chloride in dimethylformamide at 25° C. of at least 0.5, and preferably from 0.8 to 2.0 dl.g$^{-1}$, and formed of macromolecular chains consisting essentially of repeat units having the structure

—NH.—Z—NH —CO—Z—CO—I where each Z is selected from divalent carbocyclic groups and divalent groups having the structure 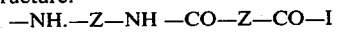 where $n$ is a whole number of from 4 to 14, and is a divalent carbocyclic group in from 3 to 36 percent of said units, and Z is a divalent organic radical having a chain of at least two carbon atoms between the free valencies and has the structure

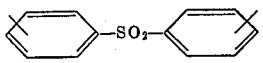

in at least 80 percent of said units.

By a divalent carbocyclic group, we mean an organic group in which each of the two free valencies is attached to a carbon atom which is part of a carbocyclic system.

The copolyamides of our invention are derived from a diamine component comprising at least one bis(aminophenyl)sulphone (or a mixture thereof with up to 20 mole percent of at least one other diamine having a chain of at least two carbon atoms between the amine groups) and a dicarboxylic acid component comprising a mixture of (a) at least one α, ω-polymethylene dicarboxylic acid having from six to 16 carbon atoms in all and (b) at least one dicarboxylic acid wherein each carboxyl group is attached to a carbon atom which forms part of a carbocyclic system, the later forming from 3 to 36 mole percent of the dicarboxylic acid component. The minimum effective amount of the latter acid depends upon its nature but in general we have found that the use of less than 3 mole percent thereof may not give a useful improvement in hydrolytic stability and in general it is preferred to use at least about 10 mole percent, (i.e., so that Z is a divalent carbocyclic group in at least 10 percent of the repeat units).

Beyond about 20 to 25 mole percent the benefit obtained from increasing the concentration of divalent carbocyclic groups tends to reduce. Moreover, the presence of these groups tends to increase the water-uptake of the polymers with consequent deterioration of their thermal, physical and electrical properties. The melt viscosities of the products also tend to increase leading to difficulties in handling in hot-shaping processes and difficulties in finding satisfactory moulding conditions at which thermal and oxidative degradation can be avoided. For these reasons, it is preferred that no more than 20 or at most 25 mole percent of the dicarboxylic acid component is such as to yield divalent carbocyclic groups in the acid residues of the repeat units (i.e., Z is a divalent carbocyclic group in not more than 20 or at most 25 percent of the repeat units), although where the α,ω-polymethylene dicarboxylic acid forming the other part of the dicarboxylic acid component has 10 or more carbon atoms (including carboxy carbon atoms) the generally lower overall melt viscosities of the polymeric products may allow the use of somewhat greater proportions provided they do not exceed 36 percent.

Examples of carbocyclic dicarboxylic acids that may be used in our invention are cycloaliphatic dicarboxylic acids, e.g., cyclopentane and cyclohexane dicarboxylic acids (e.g., hexa-hydroterephthalic acid) and alkyl-, alkoxy- and/or halo-substituted derivatives thereof, and aromatic dicarboxylic acids, e.g., isophthalic acid, terephthalic acid, polynuclear dicarboxylic acids, e.g., naphthalene dicarboxylic acids and compounds having the structure

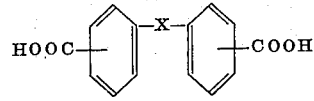

II where X is a direct link or a divalent atom or group, e.g., —O—, —S—, —S—, —SO$_2$—, —SO$_2$—, —CO—, —NR—(OR'—)$_a$O or —R"— where R is a monovalent hydrocarbon group or halogenated derivative thereof and R', R" and a have the possibilities and preferences ascribed below, and substituted derivatives of the below aromatic acids wherein one or more of the hydrogen atoms attached to aromatic carbon atoms may be replaced by, for example, alkyl or alkoxy groups having from one to four carbon atoms or halogen atoms. Preferably the carboxyl groups in the carbocyclic dicarboxylic acid are situated para to each other or, in the case where they are situated on separate carbocyclic groups which are linked together, are situated para to the link, because the acids containing these structures appear to be more effective. In other words, it is preferred that all the chain-extending links in the divalent carbocyclic groups in the repeat units are para to each other.

Because of their ready availability, the carbocyclic dicarboxylic acids that will normally be used are isophthalic acid and terephthalic acid, of which the latter is preferred for the reason given above.

Mixtures of carbocyclic dicarboxylic acids may be used if desired.

The α,ω-polymethylene dicarboxylic acids used to form our copolyamides preferably contain six, seven, eight, nine, 10,12 or 14 carbon atoms (including carboxy carbon atoms). Mixtures of these acids may be used if desired.

As indicated above, up to 20 mole percent of the sulphonyl diphenyl groups in the repeat units may be replaced by other divalent organic groups having at least two carbon atoms in a chain between the free valencies, thereby providing further modification of the polymers. Examples of such groups are alkylene groups having not more than 12 carbon atoms in all, phenylene and substituted e.g., alkyl, alkoxy or halo-substituted phenylene groups and groups comprising two phenyl or substituted e.g., alkyl, alkoxy or halo-substituted phenyl groups linked together by a direct link or a divalent atom or group e.g., —O—, —S—, —S—S—, —SO—, —CO—, —(OR')$_a$O or —R"— where R' is a divalent hydrocarbon group having at least two carbon atoms in a chain linking the oxygen atoms and preferably not more than six carbon atoms in all, R" is a divalent hydrocarbon group having from one to 16 carbon atoms, preferably —C($R_1R_2$)— where each of $R_1$ and $R_2$ is a hydrogen atom or a monovalent hydrocarbon group having from one to six carbon atoms or $R_1$ and $R_2$ together form a divalent hydrocarbon group, e.g., —(CH$_2$)$_5$, and $a$ is a whole number, generally 1 or 2.

In particular, we have found that the color of the products may be improved if in the structure I above Z has the structure —CH$_2$ (CR$_3$R$_4$)$_b$ CH$_2$— III in from 4 to 20 percent of the repeat units, where each of $R_3$ and $R_4$ is a hydrogen atom or an alkyl group having from one to four carbon atoms and $b$ is a whole number of from 0 to 10 inclusive. Improvements in melt viscosity may also be achieved by this modification, the improvements being particularly noticeable where the $\alpha,\omega$-polymethylene dicarboxylic acid has from six to nine carbon atoms (including carboxy carbon atoms). With these acids, the preferred concentrations of units having the structure III are 8 to 18 percent.

Examples of diamines which may be copolymerized to yield the above structure in the repeat units are ethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethyl hexamethylene diamine and -ethyl hexamethylene diamine. Mixtures of these diamines may be used, if desired.

The copolyamides of our invention are preferably prepared by melt polycondensation, e.g., by heating the diamine and diacid components together in the melt and in the presence of a catalyst. In an alternative process the diamine component may be mixed with a substantially equimolar amount of the corresponding di(acid halides) in the presence of an acid acceptor in solution in an organic medium which is a solvent for both the components and has a swelling or at least partial solvation action on the polymeric product. However, this alternative is less preferred for economic reasons and because of the difficulties surrounding recovery of the copolyamide free of solvent. Furthermore, the production of high molecular weight products by this process is difficult in cases where the reaction mixture includes aliphatic diamine.

In accordance with the first mentioned method, the diamine component (or amide-forming derivative thereof) may be heated with the diacid component (or amide-forming derivative thereof) at a temperature of from 160° to 300° C under an inert atmosphere and in the presence of a catalytic amount of salt of hypophosphorous acid and an organic base having a p$K_a$ of less than 3.0 and preferably less than 2.5, the salt being present in the reaction mixture before the latter reaches 150° C. Very conveniently, the organic base is a bis(4-aminophenyl)sulphone and the catalyst is formed in situ in the reaction mixture by including therein hypophosphorous acid, or a compound or mixture of compounds which will produce hypophosphorous acid in said reaction mixture before the mixture reaches 150° C. Catalyst concentrations of from 0.005 to 3 percent by weight of the mixture of diamine and diacid components may be used but it is preferred to use from 0.01 to 1 percent. Preferably, the reaction is effected in two stages, the first being effected at a temperature of from 160° C. to 240° C., and the second at a higher temperature of from 220° C. to 270° C. and under a vacuum equivalent to an absolute pressure of 1 millimeter of mercury or less. Where the carbocyclic acid is an aromatic acid it may be found desirable to use it in the form of a diester thereof. For example, terephthalic acid is preferably used in the form of its diphenyl ester. The product may be extruded from the reaction vessel on completion of the reaction.

The second mentioned method may be effected at room temperature or below, temperatures of —20° C. to +25° C. being preferred. The use of an inert atmosphere, e.g., nitrogen, is preferred but not essential. Highly polar organic solvents have been found to be the most effective in producing high molecular weights and it is preferred that the solvent is also the acid acceptor. Examples of preferred solvents are N,N-dimethylacetamide and N-methyl pyrrolidone. Others that may be mentioned are methyl ethyl ketone, acetonitrile, propionitrile, cyclic tetramethylene sulphone, 2,4-dimethyl cyclic tetramethylene sulphone, hexamethylphosphoramide, tetramethyl urea, methylene chloride and N,N-dimethylpropionamide. Acid acceptors that may be used where the solvent itself does not provide this function are inorganic salts of weak acids and strong bases, e.g., sodium and ammonium carbonates, and organic bases e.g., triethylamine. Uniform reaction conditions in the solution are aided by stirring and as the reaction tends to be exothermic cooling may be desirable. The polymeric product may be isolated by conventional means, e.g., by pouring the polymer solution into a non-solvent for the polymer, e.g., water, and recovering and drying the product.

With both methods, the reaction is preferably continued until a polymer having a reduced viscosity of from 0.8 to 2.0 dl.g$^{-1}$. is obtained.

The copolyamides obtained by these processes will normally contain at least 70 and possibly as much as 250 microequivalents of acid residues per gram of polymer (measured by potentiometric titration of a solution of about 1g of the polymer in 100 ml of N,N-dimethylacetamide against 0.05N aqueous potassium hydroxide). The actual concentration depends very largely upon which manufacturing method is used, the higher values being associated with those methods requiring an acid catalyst. It may be found desirable to reduce this acid content in order to improve the hydrolytic stability of these copolyamides still further and to obtain other improvements in high temperature performance, e.g., better melt stability. This may be achieved, for example, by using an excess of the diamine component over the diacid component in the polymerization reaction mixture and/or by including a monofunctional primary or secondary amine. The choice of monofunctional amine will depend upon the production process being used. In melt polycondensation processes, it is preferred to avoid the use of those amines, e.g., the simple aromatic amines, which discolor at elevated temperatures, and suitable amines are the monoaminodiphenyl sulphones and aliphatic amines, e.g., benzylamine, n-hexylamine, n-decylamine and n-octadecylamine. In solution processes, it is difficult to achieve reaction with aliphatic amines and it is preferred to use aromatic amines e.g., aniline.

As both of the above-mentioned methods of reducing the concentration of acid residues also tend to reduce the molecular weight of the products, a compromise has to be achieved between the two. In general, it is preferred that the number of primary and secondary amine groups in the polymerization reaction mixture does not exceed 15 percent in the case of solution processes and 10 percent in the case of melt processes.

An alternative or additional method of reducing the concentration of acid residues comprises reacting the copolyamide product with isocyanate, epoxide or monofunctional primary or secondary amine, after completion of the polymerization reaction.

Amine end groups on the polymer chains may be neutralized by acylation, if desired, e.g., by reaction with acetyl chloride.

The copolyamides of our invention generally share the desirable physical, chemical and thermal properties of the homopolymers of bis(aminophenyl)sulphones and $\alpha,\omega$-polymethylene dicarboxylic acids from which they may be said to be derived. Thus, they are generally amorphous and substantially noncrystallizable, strong, tough thermoplasts having remarkably high softening points. They may be shaped in heat-softened form, for example by extrusion, moulding or vacuum forming, in conventional equipment for hot shaping thermoplastic materials, or, alternatively, they may be dissolved in suitable solvents, for example dimethylformamide, N,N-dimethylacetamide, tetramethylene sulphone, tetramethyl urea, dimethylsulphoxide, N-methylpyrrolidone and hexamethylphosphoramide, and coatings, films, filaments, and fibers, which are generally transparent, may be obtained from the solutions. The films, filaments and fibers may be drawn if desired.

The shaped products obtained from the copolyamide of the invention are generally amorphous, strong and tough and their room temperature strength is retained to a remarkable degree at elevated temperatures even approaching the full Vicat softening points of the polymers themselves unexpectedly high. They exhibit improved resistance to softening and/or reduction in molecular weight on exposure to boiling water. The products are also resistant to corrosive atmospheres, both acidic and alkaline, and resist embrittlement either by prolonged exposure to elevated temperatures or by exposure to most common organic solvents.

The copolyamides of our invention also show useful dielectric properties. Thus, in the form of film, they may be used as decorative trim, slot liners in electrical motors, insulation in transformers, capacitors, cables and the like. They may also be moulded, for example, into corrosion-resistant pipe or into containers. Solutions of the polymers may be used as varnishes and adhesives and for coating wire, fabric and the like. Fibers formed from the polymers, for example by spinning from solution, may be woven into fabric, for example for making protective clothing or filters, or may be formed into woven electrical sheathing. Dispersions of the polymers may be prepared in organic or aqueous media.

Our preferred copolyamides are those derived from bis(4-aminophenyl) sulphone and/or bis(3-aminophenyl)sulphone and mixtures of one or more of adipic, pimelic, suberic, azelaic, sebacic, 1,10-decanedicarboxylic and 1,12-dodecanedicarboxylic acids with isophthalic acid or, more preferably, terephthalic acid. Bis(4-aminophenyl)sulphone is particularly preferred as the diamine component where high softening points are required in the products. The copolyamides of this diamine with adipic acid are particularly notable for the properties of their moulded products and the copolyamides from azelic acid and from decane-1,10-dicarboxylic acid are notable particularly for their properties as fibers.

The polymers of the present invention may be further modified by the inclusion in the polymerization reaction mixture of small amounts of reactive monofunctional materials to act as molecular weight regulators, and/or small amounts of reactive trifunctional or higher polyfunctional materials, for example, 4,4'-diaminodiphenylamine, 2,2,4'-triaminodiphenyl sulphone or 3,3'-diaminobenzidine, to act as chain branching and cross-linking agents.

The polyamides of the present invention may, if desired, have mixed therewith additives such as, for example, heat and light stabilizers, lubricants, plastisers, pigments, dyes, mould-release agents and fillers such as glass fibers, asbestos fiber, finely powdered metals or metal oxides, graphite, carbon black, ground glass and molybdenum disulphide, and may be blended with other polymeric materials, natural or synthetic.

The invention is now illustrated by the following Examples in which all parts are expressed as parts by weight unless otherwise stated. The bis(4-aminophenyl)sulphone used in the Examples is that sold commercially under the trade name "Dapsone BP" by Imperial Chemical Industries and the azelaic acid used is that sold under the trade name "Emerox 1144" by Emery Chemicals.

EXAMPLE 1.

56.2 parts of azelaoyl chloride were added slowly under an atmosphere of dry nitrogen to a solution of 62.6 parts of bis(4-aminophenyl)sulphone in 470 parts of N,N-dimethylacetamide which had been cooled to −20° C. The mixture was cooled to keep the temperature below −10° C. When the addition was complete, stirring was continued for a further ½ hour. The reaction temperature was allowed to rise to room temperature over a period of 1½ hours, stirring being continued, and the mixture then diluted with 470 parts of N,N-dimethylacetamide. The polymer was recovered by pouring the reaction mixture into 1,000 parts of vigorously stirred distilled water. The product was washed in water in a high speed mixer and then twice in methanol, and dried at 90° C. and an absolute pressure of 0.2 mm of Hg for 18 hours to yield 100 parts of fibrous polymer.

A sample of this polymer was dried at 170° C. and an absolute pressure of 0.2 mm of Hg for 2 days and then compression moulded at 270° C. On immersing samples of the resulting transparent film in boiling water, they softened almost immediately and after 240 hours they had become opaque and fragile and the reduced viscosity measured on a solution of 1g of polymer in 100 ml of a 5 weight percent solution of lithium chloride in dimethylformamide had fallen from 0.97 to 0.24 dl.g$^{-1}$.

The polymerization process described above was repeated in three further experiments using 2.5 parts (5 mole percent) of freshly distilled terephthaloyl chloride and 53.4 parts (95 mole percent) of azelaoyl chloride in Experiment A, 2.5 parts (5 mole percent) of freshly distilled isophthaloyl chloride and 53.4 parts (95 mole percent) of azelaoyl chloride in Experiment B, and 1.5 parts (3 mole percent) of terephthaloyl chloride and 54.8 parts (97 mole percent) of azelaoyl chloride in Experiment C.

Tough transparent films were prepared from dried samples of the polymers obtained from each of Experiments A, B and C, as described above, When samples of these films were immersed in boiling water they all remained rigid for more than 24 hours. After 48 hours the film from Experiment B had softened but after 217 hours the film from Experiment A was still tough. Its reduced viscosity, measured on a solution of 1g of polymer in 100 ml of a 5 weight percent solution of lithium chloride in dimethylformamide, had fallen from 1.38 to 0.62 dl.g$^{-1}$.

EXAMPLE 2.

The polymerization process of Example 1 was repeated but using 940 parts of N,N-dimethylacetamide, and 5.10 parts (10 mole percent) of terephthaloyl chloride dissolved in 50.60 parts (90 mole percent) of azelaoyl chloride, 98.0 parts of polymer were obtained by adding a further 940 parts of N,N-dimethylacetamide to the viscous polymer solution and then pouring this into 1,000 parts of water and drying the recovered polymer as described in Example 1.

Tough transparent films were compression moulded from a sample of this copolymer as described in Example 1. When a sample of film was immersed in boiling distilled water it did not soften. After 163 hours, the film was still transparent and tough. The reduced viscosity, as measured in Example 1, had dropped from 1.40 to 1.00 dl.g$^{-1}$.

EXAMPLE 3.

The polymerization process of Example 2 was repeated but using 7.6 parts (15 mole percent of terephthaloyl chloride and 47.8 parts (85 mole percent) of azelaoyl chloride. 97.5 parts of dry polymer were obtained.

A tough transparent film was compression moulded from a sample of this copolymer as described in Example 1. A sample of this film did not soften when immersed in boiling distilled water and after 165 hours it was still tough.

EXAMPLE 4.

0.25 parts (5 mole percent) of freshly distilled terephthaloyl chloride was dissolved in 5.34 parts (95 mole percent) of freshly distilled azelaoyl chloride and the solution was added over a period of 10 minutes under an atmosphere of dry nitrogen to a stirred solution of 6.26 parts of bis(4-aminophenyl)sulphone dissolved in 47 parts of N,N-dimethylacetamide which had been cooled to −20° C. The mixture was cooled to keep the temperature below −10° C. when the addition was complete, stirring was continued for a further ½ hour. The reaction temperature was then allowed to rise to room temperature over a period of 1½ hours, stirring being continued. 0.55 part of acetyl chloride was added and stirring was continued for 10 minutes. The viscous reaction mixture was then diluted with 47 parts of N-N-dimethylacetamide and the polymer was recovered by pouring the reaction mixture into 100 parts of vigorously stirred distilled water. The product was then washed with water in a high speed mixer, and then twice with methanol, and was dried at 90° C. at an absolute pressure of 0.2 mm of Hg for 18 hours. 9.85 parts of a polymer were obtained as a white fibrous powder.

A sample of this polymer was dried at 170° C. and an absolute pressure of 0.2 mm of Hg for 2 days and then compression moulded at 270° C. to give clear films having a reduced viscosity, measured as described in Example 1, of 0.57 dl.g$^{-1}$. A sample of this film did not soften when immersed in boiling water although its properties had deteriorated to some extent after 160 hours immersion. On examination its reduced viscosity was found to have dropped to 0.36 dl.g$^{-1}$.

By way of comparison, the above polymerization and acylation procedure was repeated but omitting the terephthaloyl chloride and using 5.62 parts of azelaoyl chloride. 9.9 parts of polymer were obtained as a white fibrous solid. A sample of the polymer was dried as above and then compression moulded at 270° C. to give clear films having a reduced viscosity, measured as described above, of 0.57 dl.g$^{-1}$. When a sample of this film was immersed in boiling distilled water it softened almost immediately, became brittle and opaque, and eventually disintegrated.

Example 5.

The polymerization and acylation processes of Example 4 were repeated but using 0.76 part (15 mole percent) of terephthaloyl chloride and 4.78 parts (85 mole percent) of azelaoyl chloride. 9.8 parts of dry polymer were obtained.

Tough transparent films were cast from a solution of this polymer in N,N-dimethylacetamide and dried at 130° C. under an absolute pressure of 1 mm of Hg for 48 hours followed by 170° C. at 1 mm of Hg for a further 48 hours.

On immersion in boiling water for 240 hours these films remained tough, rigid and transparent. The reduced viscosity, determined as in Example 1, fell from 0.83 to 0.70 dl.g$^{-1}$.

Example 6.

The polymerization and acylation procedures of Example 4 were repeated but using 1.02 parts (20 mole percent) of terephthaloyl chloride and 4.50 parts (80 mole percent) of azelaoyl chloride. 9.9 parts of a fibrous polymer were obtained.

Tough transparent films were prepared from this polymer by the method described in Example 4. On immersion in boiling water for 190 hours these films remained tough and rigid. The reduced viscosity, determined as in Example 1, fell from 0.75 to 0.55 dl.g$^{-1}$.

EXAMPLE 7.

The polymerization and acylation processes of Example 4 were repeated using 6.26 parts of bis(4-aminophenyl)sulphone, 5.06 part (90 mole percent) of azelaoyl chloride and 0.51 part (10 mole percent) of isophthaloyl chloride in 47 parts of N,N-dimethylacetamide. 9.8 parts of dry polymer were recovered.

Tough transparent films were cast from solutions of this polymer in N,N-dimethylacetamide and dried as described in Example 5. On immersion in boiling water samples of these films did not soften. After 168 hours, the reduced viscosity (determined as described in Example 1) had fallen from 1.27 to 0.89 dl.g$^{-1}$.

Example 8.

The polymerization and acylation processes of Example 7 were repeated but using 0.76 part (15 mole percent) of isophthaloyl chloride and 4.78 parts (85 mole percent) of azelaoyl chloride. 9.9 parts of dry polymer were recovered.

A tough transparent film was cast from this polymer and dried under the conditions detailed in Example 5. A sample of this film when immersed in boiling water remained rigid and tough. After 144 hours immersion, its reduced viscosity (determined as described in Example 1) had fallen from 0.87 to 0.73 dl.g$^{-1}$.

EXAMPLE 9.

The process of Example 7 was repeated but using 9.00 parts (80 mole percent) of azelaoyl chloride and 2.04 parts (20 mole percent) of isophthaloyl chloride, and a solution of 12.52 parts of 4,4'-diamino-diphenyl sulphone in 94 parts of N,N-dimethylacetamide. 20.0 parts of dry powder were obtained.

A sample of this polymer was cast into a film and dried as described in Example 5. On immersion in boiling water a sample of this film remained rigid and tough. After 185 hours immersion, its reduced viscosity (determined as described in Example 1) had dropped from 0.95 to 0.66 dl.g$^{-1}$.

EXAMPLE 10.

The process of Example 7 was repeated using 6.26 parts of bis(4-aminophenyl)sulphone, 4.22 parts (75 mole percent) of azelaoyl chloride, and 1.27 parts (25 mole percent) of isophthaloyl chloride and 47 parts of N,N-dimethylacetamide.

Tough transparent films were prepared from an N,N-dimethyl-acetamide solution of this copolymer and dried as described in Example 5. When a sample of this film was immersed in boiling water it remained rigid. After 160 hours immersion, its reduced viscosity (determined as described in Example 1) had dropped from 0.90 to 0.66 dl.g$^{-1}$.

The process was repeated using 3.67 parts (65 mole percent) of azelaoyl chloride and 1.78 parts (35 mole percent) of isophthaloyl chloride. A sample of a tough transparent film prepared from the polymer as described above was immersed in boiling water. It remained rigid and after 160 hours immersion its reduced viscosity had dropped from 0.69 to 0.50 dl.g$^{-1}$.

EXAMPLE 11.

The polymerization process of Example 2 was repeated using 2.5 parts (5 mole percent) of terephthaloyl chloride and 53.4 parts (95 mole percent) of azelaoyl chloride.

Ten parts of the resulting copolymer were dissolved in 188 parts of N,N-dimethylacetamide and 1.1 parts of acetyl chloride were added. The solution was stirred for 4 hours at room temperature and the polymer recovered by pouring into vigorously stirred distilled water. The product was washed in water in a high speed mixer and then with methanol and dried at 90° C. and an absolute pressure of 0.2 mm of Hg for 18 hours to yield 8.9 parts of polymer.

A sample of this polymer was further dried at 170° C. and an absolute pressure of 0.2 mm of Hg for 2 days and then compression moulded at 270° C. to give tough transparent films. When a sample of the film was immersed in boiling distilled water it remained rigid even after 161 hours. The reduced viscosity (determined as described in Example 1) fell from 0.81 to 0.48 dl.g$^{-1}$ over that period.

By way of comparison the above acylation procedure was repeated on 10 parts of a polymer prepared from 4,4'-diaminodiphenyl sulphone and azelaoyl chloride.

A sample of this acylated polymer, dried as described above, was compression moulded at 270° C. to give tough transparent films. When samples of these films were immersed in boiling distilled water they softened almost immediately, became brittle and eventually disintegrated.

EXAMPLE 12.

The polymerization process of Example 2 was repeated using 5.1 parts (10 mole percent) of terephthaloyl chloride and 50.6 parts (90 mole percent) of azelaoyl chloride.

Twenty-five parts of the copolymer so obtained were acylated as described in Example 11.

under an atmosphere of nitrogen for 4 hours while phenol was evolved. The melt was solidified by pouring onto a sheet of aluminum foil and was then ground to give 509.5 parts of a fine cream colored powder.

509.5 parts of this powder, 368.5 parts (95 molar parts) of azelaic acid and 3.6 parts of a 50 percent by weight aqueous solution of hypophosphorous acid were then mixed and polymerized under the reaction conditions described in the previous experiment.

A sample of this polymer was immediately compression moulded at 270° C. to give a transparent yellow film. When a sample of this film was immersed in boiling water it remained rigid for over 80 hours.

EXAMPLE 19.

471.2 parts (95 molar parts) of dry bis(4-aminophenyl)sulphone, 11.6 parts (5 molar parts) of hexamethylene diamine, and 380.0 parts (101 molar parts) of azelaic acid were mixed with 3.6 parts of a 50 percent by weight aqueous solution of hypophosphorous acid and heated in a flange neck flask at 180°–200° C. under a slow stream of nitrogen for 1 hour. The melt was then transferred to an autoclave preheated to 250°. After stirring for 1 hour the temperature was raised to 260°. Vacuum was slowly applied until an absolute pressure of 0.1 to 0.5 mm of mercury was attained and the reaction was kept under these conditions for 1¾ hours. The resulting product (reduced viscosity 1.31 dl.g$^{-1}$) was extruded from the autoclave under nitrogen pressure and it was noted that the color, pale yellow, was paler than that of a polyamide of bis(4-aminophenyl)sulphone and azelaic acid of comparable reduced viscosity. A sample of the extrudate was compression moulded at 270° C. to give a transparent film. When a sample of this film was immersed in boiling distilled water it softened within 4 to 5 hours and after 120 hours the reduced viscosity, measured as in Example 1, dropped from 1.6 to 0.45 dl.g$^{-1}$.

The above procedure was repeated in a second experiment but using a mixture of 346.0 parts (90 molar parts) of azelaic acid and 33.6 parts (10 molar parts) of isophthalic acid as the diacid component and applying the vacuum for 3½ hours. The product had a reduced viscosity of 0.66 dl.g$^{-1}$ and was a paler color than a copolyamide of bis(4-aminophenyl)sulphone with a 90/10 azelaic acid/isophthalic acid mixture of similar reduced viscosity.

A sample of the extrudate was compression moulded at 270° to give a transparent film. When a sample of this film was immersed in boiling water it took longer to soften than the film in the first experiment of this example.

EXAMPLE 20.

3.65 parts (36 molar parts) of isophthaloyl chloride dissolved in 8.55 parts (64 molar parts) of the di(acid chloride) of decane-1,10-dicarboxylic acid were added under an atmosphere of dry nitrogen to a solution of 12.53 parts of bis(4-aminophenyl) sulphone in 83 parts of N-methyl pyrollidone which had been cooled to −5° C. The mixture was cooled to keep the temperature below −5° C. When the addition was complete, stirring was continued for a further 15 minutes then the very viscous solution was diluted by the addition of a further 72 parts of N-methyl pyrollidone. The polymer was recovered by pouring the reaction mixture into 1,000 parts of vigorously stirred distilled water. The product was washed in water in a high speed mixer and then twice in methanol and dried at 80° C. and an absolute pressure of 2 mm of Hg overnight to yield 21.1 parts of fibrous polymer.

15.0 parts of this polymer were dissolved in 141 parts of N,N-dimethylacetamide at 40° and 1.6 parts of phenyl isocyanate were added. The mixture was stirred at 50°–55° C. for 2½ hours. The resulting solution was precipitated into 2 percent aqueous ammonia, the precipitate filtered off and washed thoroughly with water then methanol and then dried as above to give 14.8 parts of a fibrous polymer having a reduced viscosity of 0.94 dl.g$^{-1}$.

A sample of this treated polymer was dried for 2 days at 170° C. and an absolute pressure of 0.2 mm of Hg and then compression moulded at 260° for 2 minutes to give tough plaques 1¼ × ½ × 1/16 in. of reduced viscosity 1.00 dl.g$^{-1}$.

The melt viscosity was determined on a sample obtained from one of these plaques. The determination was carried out on a small-scale capillary viscometer of the kind described in Rheologica Acta, 1969, Volume 8 at pages 226 to 229, using a die 0.5 inch long. At 260° and 1 sec$^{-1}$, the melt viscosity was found to be $1.6 \times 10^6$ poise.

A 1¼ × ½ × 1/16 inch plaque was immersed in water at room temperature for 118 hours. On recovery and removal of surface moisture, it was found to have absorbed 1.67 weight percent of water.

The procedure given above was repeated using 6.67 parts (50 molar parts) of the diacid chloride of decane-1,10-dicarboxylic acid and 5.08 parts (50 molar parts) of isophthaloyl chloride. 21.2 parts of a fibrous polymer were obtained having a reduced viscosity of 0.97 dl.g$^{-1}$.

15.0 parts of this polymer were treated with phenyl isocyanate as detailed above to give 14.8 parts of fibrous polymer having a reduced viscosity of 1.16 dl.g$^{-1}$.

The treated polymer was thoroughly dried as above and then compression moulded for 2 minutes at 280° to give a tough 1¼ × ½ × 1/16 inch plaques having a reduced viscosity of 1.08 dl.g$^{-1}$.

An attempt was made to determine the melt viscosity on a sample of one of these plaques using the apparatus described above. However at 260° the material could not be extruded through the die.

A 1¼ × ½ × 1/16 inch plaque was immersed in water at room temperature for 118 hours. On recovery and removal of surface moisture, it was found to have absorbed 1.86 weight percent of water.

EXAMPLE 21.

Four-hundred-ninety-six parts of (100 molar parts) bis(4-aminophenyl)sulphone, 10.8 parts (4 molar parts) of n-octadecylamine, 346 parts (90 molar parts) of azelaic acid, 33.6 parts (10 molar parts) of isophthalic acid and 3.6 parts of 50 weight percent aqueous hypophosphorous acid were mixed and heated at 200° for 1 hour under an atmosphere of nitrogen. The resulting melt was poured into a polymerization autoclave preheated to 240° and the reaction mixture was stirred while the temperature was raised to 260°. Vacuum was slowly applied until an absolute pressure of 0.1 mm of Hg was obtained and the reaction mixture was kept under these conditions for 1¼ hours. The polymer was extruded under nitrogen pressure and had a reduced viscosity of 0.69 dl.g$^{-1}$.

A film having a reduced viscosity of 0.67 dl.g$^{-1}$ was compression moulded from the polymer and was immersed in boiling water. After 48 hours it was still tough and its reduced viscosity had dropped from 0.67 to 0.56 dl.g$^{-1}$.

What we claim is:

1. A copolyamide having a reduced viscosity, measured on a solution of 1g of polymer in 100 ml of a 5 percent by weight wolution of lithium chloride in dimethylformamide at 25° C., of at least 0.5 dl.g$^{-1}$, and formed of macromolecular chains consisting essentially of repeat units having the structure

—NH—Z′—NH—CO—Z—CO— where each Z is a mixture of a divalent carbocyclic group and a divalent group having the structure $(CH_2)_n$ where n is a whole number of from 4 to 14, Z being a divalent carbocyclic group in 3 to 36 percent of said units, and Z′ is

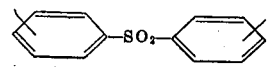

or a mixture thereof with up to 20 percent of divalent alkylene radicals.

2. A copolyamide as claimed in claim 1 in which the divalent carbocyclic group is meta-phenylene.

A sample of this acylated copolymer was further dried as described in Example 11 and compression moulded to give tough transparent films. When a sample of film was immersed in boiling distilled water for 163 hours it remained rigid and tough. The reduced viscosity (determined as described in Example 1) dropped from 0.77 to 0.58 dl. $g^{-1}$ over that period.

Example 13.

The polymerization process of Example 2 was repeated using 7.6 parts (15 mole percent) of terephthaloyl chloride and 47.8 parts (85 mole percent) of azelaoyl chloride.

Ten parts of the copolymer so obtained were acylated as described in Example 11.

Tough transparent films were obtained on compression moulding a sample of this polymer at 265° C. after it had been further dried as described in Example 11. On immersion in boiling distilled water for 195 hours a sample of film remained rigid. The reduced viscosity (determined as described in Example 1) fell from 0.67 to 0.35 dl.$g^{-1}$ over that period.

EXAMPLE 14.

The polymerization process of Example 1 was repeated but using 188 parts of N,N-dimethylacetamide, 25.04 parts of bis(4-aminophenyl) sulphone and 4.18 parts (20 mole percent) of hexahydroterephthaloyl chloride dissolved in 18.0 parts (80 mole percent) of azelaoyl chloride. 39.9 parts of polymer were obtained by adding a further 188 parts of N,N-dimethylacetamide to the viscous polymer solution and then pouring this into 200 parts of vigorously stirred distilled water and drying the recovered polymer as described in Example 1.

Tough transparent films were compression moulded from a sample of this copolymer as described in Example 1. When a sample of film was immersed in boiling water for 336 hours it remained rigid and the reduced viscosity, as measured in Example 1, dropped only slightly from 0.50 to 0.43 dl.$g^{-1}$.

Example 15.

The polymerization process of Example 1 was repeated but using 75 parts of N,N-dimethylacetamide, 6.26 parts of bis(4-aminophenyl) sulphone and 0.25 part (5 mole percent) each of isophthaloyl chloride and terephthaloyl chloride dissolved in 5.06 parts (90 mole percent) of azelaoyl chloride. 9.8 parts of polymer were obtained by adding a further 75 parts of N,N-dimethylacetamide to the viscous polymer solution and then pouring this into 160 parts of vigorously stirred, distilled water and drying the recovered polymer as described in Example 1.

Tough transparent films were compression moulded from a sample of this copolymer as described in Example 1. When a sample of film was immersed in boiling water for 168 hours it remained rigid and the reduced viscosity, as measured in Example 1, dropped from 0.65 to 0.49 dl.$g^{-1}$.

EXAMPLE 16.

14.64 parts of adipoyl chloride were added slowly under an atmosphere of nitrogen to a solution of 19.86 parts of bis(4-aminophenyl)sulphone in 75 parts of N,N-dimethylacetamide which had been cooled to −20° C. and the viscous reaction mixture was stirred for 45 minutes at 20°. 150 parts of dimethylformamide were then added and the polymer was recovered by pouring the reaction mixture into vigorously stirred distilled water. The product was washed twice with methanol and dried at 80° C. in a vacuum oven to yield 28.0 parts of polymer.

A transparent film was compression moulded from a sample of this polymer as described in Example 1. When a sample of this film was immersed in boiling water for 336 hours the reduced viscosity, as measured in Example 1, dropped from 0.65 to 0.14 dl. $g^{-1}$.

The polymerization process described above was repeated but using as the diacid component 7.32 parts (80 mole percent) of adipoyl chloride, and 2.03 parts (20 mole percent) of terephthaloyl chloride. The two diacid chlorides were added simultaneously to a solution of 12.5 parts of bis(4-aminophenyl)sulphone in 141 parts of N,N-dimethylformamide. 17.5 parts of dry polymer were obtained. A transparent film was compression moulded from a sample of this polymer as described in Example 1. When a sample of this film was immersed in boiling water for 336 hours the reduced viscosity, as measured in Example 1, dropped from 0.60 to 0.20 dl.$g^{-1}$.

EXAMPLE 17.

The polymerization process of Example 1 was repeated but using 13.35 parts of the diacid chloride of decane-1,10-dicarboxylic acid and 12.53 parts of bis(4-aminophenyl)sulphone in 141 parts of N,N-dimethylacetamide. 21.6 parts of dry polymer were obtained.

A tough transparent film was compression moulded from a sample of this polymer as described in Example 1. When a sample of this film was immersed in boiling distilled water it had softened slightly after 46 hours and after 336 hours the reduced viscosity, as measured in Example 1, had dropped from 1.21 to 0.31 dl.$g^{-1}$.

In a further experiment using the process described above, 10.18 parts (80 mole percent) of the diacid chloride of decane-1,10-dicarboxylic acid and 2.03 parts (20 mole percent) of terephthaloyl chloride were added simultaneously to a solution of 12.52 parts of bis(4-aminophenyl)sulphone in 141 parts of N,N-dimethylacetamide. 21.0 parts of dry polymer were obtained.

A tough transparent film was compression moulded from a sample of this polymer as described in Example 1. When a sample of this film was immersed in boiling water it did not start to soften until after 168 hours and after 312 hours the reduced viscosity, as measured in Example 1, had dropped from 0.61 to 0.46 dl.$g^{-1}$.

EXAMPLE 18.

496 parts of bis(4-aminophenyl)sulphone and 380 parts of azelaic acid were mixed with 3.63 parts of a 50 percent by weight aqueous solution of hypophosphorous acid and heated in a flange-neck flask at 190° C. under a slow stream of nitrogen for 2 hours. The prepolymer melt was then poured into an autoclave which had been preheated to 200°, and stirred at 260° under an atmosphere of nitrogen for 1 hour while water gradually distilled off. A vacuum of between 0.1 and 0.5 mm of mercury absolute pressure was then applied and the reaction continued under these conditions for 1½ hours while the viscosity increased steadily. The melt was then extruded from the autoclave under nitrogen pressure. A sample of this polymer was immediately compression moulded at 270° C. to give transparent yellow film. When a sample of this film was immersed in boiling water it softened within 4 to 5 hours.

In a second experiment 496 parts of bis(4-aminophenyl)sulphone, 346 parts (90 mole percent) of azelaic acid and 33.6 parts (10 mole percent) of isophthalic acid were mixed with 3.63 parts of a 50 percent by weight aqueous solution of hypophosphorous acid and heated in a flange neck flask at approximately 200° C. under a slow stream of nitrogen for 1 hour. The prepolymer melt was then poured into an autoclave which had been preheated to 230°. The melt was stirred, a vacuum of 0.1 to 0.5 mm of mercury absolute pressure immediately applied and the temperature raised to 260°. The reaction was continued under these conditions for 2 more hours while the viscosity rose steadily. The melt was then extruded from the autoclave under nitrogen pressure. A sample of this polymer was immediately compression moulded at 270° C. to give transparent yellow film. When a sample of this film was immersed in boiling water it remained rigid for over 100 hours.

In a third experiment, 496 part of bis(4-aminophenyl)sulphone, 32.1 parts (5 molar parts) of diphenyl terephthalate and 1.5 parts of the slat of bis(4-aminophenyl)sulphone and hypophosphorous acid were mixed and heated at 200°

3. A copolyamide as claimed in claim 1 in which the chain extending valencies on the divalent carbocyclic group are all situated para to each other.

4. A copolyamide as claimed in claim 3 in which the divalent carbocyclic group is para-phenylene.

5. A copolyamide as claimed in claim 1 in which $n$ is 4, 7 or 10.

6. A copolyamide as claimed in claim 1 in which Z is a divalent carbocyclic group in at least 10 percent of said units.

7. A copolyamide as claimed in claim 1 in which $n$ is less than 8 and Z is a divalent carbocyclic group in not more than 25 percent of said units.

8. A copolyamide as claimed in claim 1 which is a copolymer of (i) adipic acid, azelaic acid or decane-1,10-dicarboxylic acid, (ii) isophthalic and/or terephthalic acid, and (iii) bis(4-aminophenyl)sulphone.

9. A copolyamide as claimed in claim 1 in which y is selected from the group consisting of divalent residues having the structure

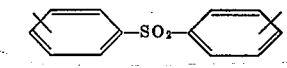 I

 II where each of $R_3$ and $R_4$ is a hydrogen atom or an alkyl group having from one to four carbon atoms and $b$ is a whole number of from 0 to 10 inclusive, and Z has the structure II in from 4 to 20 percent of the repeat units.

10. A copolyamide as claimed in claim 1 in which the concentration of acid residues is less than 70 microequivalents of acid residues per gram of polymer.

11. A fiber or film of the copolyamide claimed in claim 1.

* * * * *